United States Patent [19]

Migliorini

[11] Patent Number: 5,153,074
[45] Date of Patent: Oct. 6, 1992

[54] METALLIZED FILM COMBINATION
[75] Inventor: Robert A. Migliorini, Fairport, N.Y.
[73] Assignee: Mobil Oil Corporation, Fairfax, Va.
[21] Appl. No.: 788,058
[22] Filed: Nov. 5, 1991
[51] Int. Cl.$^5$ .............................................. B32B 15/08
[52] U.S. Cl. ................................... 428/463; 428/520; 428/522; 428/910
[58] Field of Search ................. 428/463, 461, 520, 522

[56] References Cited
U.S. PATENT DOCUMENTS

| | | | |
|---|---|---|---|
| 2,490,550 | 12/1949 | Sermattei et al. | 524/487 |
| 3,382,092 | 5/1968 | Ilnyckyj et al. | 428/461 |
| 3,480,580 | 11/1969 | Joyner et al. | 260/29.6 |
| 4,818,609 | 4/1989 | Schmoock | 428/463 |
| 4,877,685 | 10/1989 | Bergstrom et al. | 428/500 |

Primary Examiner—Edith L. Buffalow
Attorney, Agent, or Firm—A. J. McKillop; C. J. Speciale; J. P. O'Sullivan, Sr.

[57] ABSTRACT

A metallized film combination of a polymer substrate at least one surface of which includes a maleic acid anhydride modified propylene homopolymer or copolymer, that at least one surface having a skin layer thereon of ethylene vinyl alcohol copolymer and said skin layer having an aluminum layer directly thereon.

8 Claims, No Drawings

METALLIZED FILM COMBINATION

BACKGROUND OF THE INVENTION

Oriented plastic film, particularly biaxially oriented polypropylene films, are used widely as packaging materials for a variety of products including many popular snack foods such as crackers, nuts, potato chips, etc. Certain films are not generally suitable for use as containers for foods or as a wrapper for foods, medical compounds, beauty preparations and the like, unless the same is modified for the exclusion of gases.

It is an object of the present invention to provide an improved gas barrier film which also has low permeability to moisture. It is another object of this invention to provide a metallized multi-layer film sheet wherein the layers are bonded together with an exceptionally strong bonding force.

SUMMARY OF THE INVENTION

The present invention provides a metallized film combination comprising a polymer substrate, which substrate is susceptible in unmodified form of transmitting oxygen and water vapor, at least one surface thereof comprising a maleic acid anhydride modified propylene homopolymer or copolymer, said at least one surface having a skin layer thereon of ethylene vinyl alcohol copolymer and said skin layer having aluminum deposited directly thereon.

In a preferred form of the above-defined structure, the substrate comprises a propylene homopolymer or copolymer. The above-mentioned surface comprises a member selected from the group consisting of:

(a) said maleic acid anhydride modified propylene homopolymer or copolymer intermixed with said propylene homopolymer or copolymer substrate; and (b) a separately applied skin layer comprising said maleic acid anhydride modified propylene homopolymer or copolymer on said substrate.

The preferred surface is maleic acid anhydride modified propylene homopolymer or copolymer intermixed with the polymer substrate. Alternatively, at least one surface comprises maleic acid anhydride modified propylene homopolymer or copolymer applied as a separate skin layer to the substrate.

DETAILED DESCRIPTION OF THE INVENTION

It has been determined that if the surface of the substrate is modified by a particular functionalized material or if it contains thereon a functionalized skin layer, then poly(vinyl alcohol) will aggressively adhere to this so-modified surface. It has been determined that the use of a maleic anhydride modified polypropylene homopolymer or copolymer becomes a part of the substrate surface either by being interblended therewith or by being coextruded thereon as a surface skin layer. This modified surface layer or skin layer itself cannot be separated from the substrate layer. In addition, it has been determined that with such a surface, a poly(vinyl alcohol) coating thereon adheres tenaciously to this material. By a "maleic anhydride modified polypropylene homopolymer or copolymer" is meant the product resulting from the reaction between maleic anhydride and the thermal degradation product of polypropylene or polypropylene copolymer. Examples of this material can be found disclosed in U.S. Pat. No. 3,480,580, issued Nov. 25, 1969, the disclosure of which is incorporated herein by reference in its entirety. Particular attention is directed to Examples 3, 4 and 6 of this patent.

The maleic anhydride modified polypropylene or a copolymer thereof can be prepared by a fairly simple process. For example, about 125 grams of low viscosity polypropylene of 3,300 centipoise at 190° C. and 7.5 grams of maleic anhydride are placed in a 500 ml. glass, round-bottom flask. This flask has 3 necks and is fitted with a metal sweep stirrer, a dropping funnel, and a steam-jacketed condenser to return maleic anhydride which boils out of the reaction mixture. The flask is lowered into a Wood's metal bath at a temperature of about 200° C. After about 1 hour the product is poured from the flask onto a metal tray. The waxy product will have a melt viscosity of 3,600 centipoise at 190° C. and a saponification number of 16.

Low viscosity polymers can also be produced in the above manner from low molecular weight 98-96/2-4 propylene/ethylene copolymers, 50/50 propylene/1-butene copolymer, 95/5 propylene/1-pentene copolymer, 90/10 propylene/1-hexene copolymer, 80/20 propylene/4-methyl-1-pentene copolymer, 75/25 propylene/1-dodecene copolymer and 90/10 1-butene/-hexene copolymer. In general, propylene copolymerized with another alpha olefin, including ethylene.

The procedure for the use of a maleic anhydride modified polypropylene homopolymer or copolymer, when this material is interblended into the base layer is exemplified by the following technique. A maleic anhydride modified polypropylene e.g., Epolene E-43, a maleic anhydride modified polypropylene obtained from Eastman Kodak Company, melt-blended with a polypropylene homopolymer such as Exxon 4252 (85 parts) to give a 15% master batch. Twenty parts of the master batch is dry-blended with 80 parts of the polypropylene homopolymer to give a resin blend containing 3% of the maleic anhydride modified polypropylene. This blend will contain sufficient maleic anhydride-modified polypropylene at the surface of the substrate to aggressively bond poly(vinyl alcohol) thereto. An alternative method of making available the maleic anhydride-modified polypropylene homopolymer or copolymer at the surface of the substrate is to coextrude the base polymer with a skin layer containing the maleic anhydride-modified polymer.

The improved metallized film is achieved by adhering a thin layer of ethylene vinyl alcohol (EVOH) copolymer onto the surface of a substrate, such as an oriented polypropylene film, which has been modified by a maleic acid anhydride polypropylene homopolymer or copolymer. The layer can range in thickness from 3-30 gage units. The EVOH layer can be attached to the polypropylene core by any one of three processes: 1) coextrusion of an EVOH skin and the modified polypropylene core with the use of a mixing block or multicavity die, 2) extrusion coating of the EVOH layer onto the surface of the modified polypropylene between the machine direction orientation treatment of the film and the transverse direction orientation, 3) co-lamination of a thin EVOH film onto the surface of the modified polypropylene sheet between the machine direction orientation step and the transverse direction orientation step. For coextrusion, a suitable adhesive for bonding EVOH to polypropylene must be either incorporated into the polypropylene core or used as a tie layer between the EVOH and the polypropylene layers. The above-described resins with maleic anhydride graphed onto polypropylene are particularly suitable. For extrusion coating and colamination, it is necessary to corona treat the polypropylene surface for bonding just prior to contact with the EVOH melt or film. The EVOH/polypropylene structure subsequently gets oriented in the transverse direction in a tenter frame. The EVOH copolymer can have an ethylene contact ranging from 30–50%. A heat sealable film can be produced by coextruding an ethylene propylene (EP) copolymer or an ethylene propylene butene-1 (EPB) copolymer on the side of the substrate opposite to the EVOH.

The EVOH skin comprises the surface for aluminum deposition by typical vacuum metallization processes. An aluminum coating thickness yielding an optical density of about 1.5–3.0 is desired. A further advantage of this surface is that is not necessary to treat the EVOH skin surface prior to vacuum metallization because it inherently has a wetting tension of 39 dynes/cm. The polar nature of the EVOH skin layer results in excellent aluminum adhesion to the substrate without the use of a surface treatment. The metallized OPP film also exhibits excellent bond strength and metal fracture resistance in both adhesive and extrusion lamination applications. Part of the unobvious aspect of the present invention is the unexpected improvement in moisture barrier characteristics that is achieved by metalizing directly onto the EVOH surface. EVOH is inherently a poor moisture barrier material. In most polypropylene/EVOH coextrusion structures, the EVOH is buried to protect it from atmospheric moisture and hence preserve its excellent oxygen barrier properties. By metalizing on top of the EVOH surface, a synergistic effect on moisture barrier characteristics is achieved that would not be predicted on the moisture barrier properties of the components. It is hypothesized that this effect is due to the formation of a different aluminum morphology than that achieved for typical metallized OPP. The metallized EVOH/OPP film formed as disclosed herein yields a very glossy metal appearance and good metal layer uniformity.

Following is an example illustrating the invention.

EXAMPLE

A three layer structure was produced by coextrusion using the following materials:

A-Layer = ethylene vinyl alcohol copolymer (48% ethylene);

B-Core Layer = 50% polypropylene homopolymer/50% adhesion promoter DuPont Bynel E-394 i.e., polypropylene modified with maleic acid anhydride; and C-Layer = ethylene propylene butene-1 terpolymer with the ratio ethylene 2% propylene 94% butene-1 4%.

The extruded film was quenched at 70° on a cast roll, reheated to 230° F. and stretched 3.0 times its original length in the machine direction. The sheet was subsequently stretched 8 times its original width in a tenter frame at 310°–320° F. The biaxially oriented film was not corona treated prior to winding. Line speed was 50 fpm.

The final film was 80–100 gauge units in total thickness with an EVOH skin thickness of 3 gauge units, and a terpolymer skin thickness of 6 gauge units. The wetting tension of the EVOH skin was measured to be 39 dynes/cm off-line.

The film was vacuum metallized with aluminum using a conventional process. A conventional metallizing process consists of placing a roll of film in a vacuum chamber at a pressure of $1 \times 10^{-3}$ to $1 \times 10^{-6}$ torr. The film is then unwound and travels above a cloud of aluminum, where condensation occurs to produce an aluminum coating from 100 to 500 angstroms in thickness. The aluminum cloud is produced by feeding aluminum wire on resistance heated intermetallic boats. The metallized film is then rewound, and removed from the chamber. Two film samples were metallized with aluminum on the EVOH skin. One sample was metallized with aluminum on the EPB terpolymer skin. Barrier properties were measured on the metallized films produced. Water vapor transmission rate (g/100 in$^2$/24hr) was measured at 100° F., 90% RH. Oxygen transmission rate (cc/100 in$^2$/24hr) was measured at 73° F., 0% RH. Optical density was also measured to get an indication of aluminum coating thickness. The level of aluminum adhesion to the substrate was measured by reporting the % metal pickoff after 3 pulls on the aluminum surface with Scotch Brand 610 tape. Properties obtained are as follows:

| Sample # | Skin Metallized | Optical Density | % 610 Tape Pickoff | WVTR | TO$_2$ |
| --- | --- | --- | --- | --- | --- |
| 1 | EPB terpolymer (untreated) | 1.91 | 40 | 0.580 | 142.75 |
| 2 | EVOH copolymer | 2.06 | 0 | 0.030 | 0.17 |
| 3 | EVOH copolymer | 1.96 | 0 | 0.027 | 0.35 |
| Control | Typical MET. OPP | 2.0–2.5 | 0–20 | 0.05–0.15 | 5–20 |

As shown for comparison are typical properties for commercially available metallized OPP films, i.e. aluminum deposited on a corona discharge treated OPP film. Comparison of Sample 1 with Samples 2 and 3 exhibits the favorable effect on barrier properties of depositing the aluminum on an EVOH skin. Comparison of Samples 2 and 3 with the Control exhibits the improvement in moisture and oxygen barrier relative to commercially available metallized OPP films.

The metallized EVOH/PP films were extrusion laminated to a slip film using low density polyethylene as an adherent. The metallized side of the film was buried in the lamination. Samples 2 and 3 had metallized film to low density polyethylene bond strengths of 70 g/in with no aluminum transfer to the low density polyethylene on bond pulls. No crazing of the aluminum surface was evident in the laminates.

Although the present invention has been described with preferred embodiments, it is to be understood that modifications and variations may resorted to without departing from the spirit and scope of this invention as those skilled in the art would readily understand. Such variations and modifications are considered to be within the preview and scope of the appended claims.

What is claimed is:

1. A metallized film combination comprising a polymer substrate at least one surface thereof comprising a maleic acid anhydride modified propylene homopolymer or copolymer, said at least one surface having a skin layer thereon of ethylene vinyl alcohol copolymer and said skin layer having an aluminum layer directly thereon.

2. The combination of claim 1 wherein said substrate comprises a propylene homopolymer or copolymer.

3. The metallized combination of claim 2 wherein said at least one surface comprises a member selected from the group consisting of:
(a) said maleic anhydride modified propylene homopolymer or copolymer intermixed with said propylene hompolymer or copolymer substrate and b) a separately applied skin layer comprising said maleic anhydride modified propylene homopolymer or copolymer on said substrate.

4. The combination of claim 3 wherein said surface is said maleic anhydride modified propylene homopolymer or copolymer intermixed with said polymer substrate.

5. The combination of claim 3 wherein said at least one surface comprises maleic anhydride modified propylene homopolymer or copolymer applied as a separate skin layer to said substrate.

6. The combination of claim 2 wherein said at least one surface comprises said maleic anhydride modified propylene homopolymer.

7. The combination of claim 2 wherein said at least one surface comprises said maleic anhydride modified propylene copolymer.

8. The combination of claim 1 wherein said aluminum layer has a thickness yielding an optical density of from about 1.5 to 3.0.

* * * * *